United States Patent
Dalis et al.

(10) Patent No.: US 12,503,363 B2
(45) Date of Patent: Dec. 23, 2025

(54) CUBIC BORON NITRIDE PARTICLE POPULATION WITH HIGHLY-ETCHED PARTICLE SURFACE AND HIGH TOUGHNESS INDEX

(71) Applicant: DIAMOND INNOVATIONS, INC., Worthington, OH (US)

(72) Inventors: Adamos Dalis, Worthington, OH (US); Timothy Dumm, Westerville, OH (US); Kai Zhang, Charlotte, NC (US)

(73) Assignee: Diamond Innovations, Inc., Worthington, OH (US)

( * ) Notice: Subject to any disclaimer, the term of this patent is extended or adjusted under 35 U.S.C. 154(b) by 581 days.

(21) Appl. No.: 18/065,890

(22) Filed: Dec. 14, 2022

(65) Prior Publication Data

US 2023/0119293 A1    Apr. 20, 2023

Related U.S. Application Data

(62) Division of application No. 16/569,296, filed on Sep. 12, 2019, now abandoned.

(Continued)

(51) Int. Cl.
*C01B 21/064*    (2006.01)
*C09C 3/06*    (2006.01)

(52) U.S. Cl.
CPC .......... *C01B 21/0648* (2013.01); *C09C 3/063* (2013.01); *C09C 3/066* (2013.01); *C01P 2002/76* (2013.01); *C01P 2004/03* (2013.01); *C01P 2004/61* (2013.01); *C01P 2004/80* (2013.01); *C01P 2004/90* (2013.01)

(58) Field of Classification Search
CPC ....... C09C 3/063; C09C 3/066; C04B 14/327; C04B 35/5831
See application file for complete search history.

(56) References Cited

U.S. PATENT DOCUMENTS 2,941,241 A    6/1960 Strong
2,941,248 A    6/1960 Hall
(Continued)

FOREIGN PATENT DOCUMENTS

BE    863934    5/1978
CN    106905922    6/2017
(Continued)

*Primary Examiner* — Binh X Tran
(74) *Attorney, Agent, or Firm* — Ari G. Zytcer

(57) ABSTRACT

A cubic boron nitride particle population having highly-etched surfaces and a high toughness index is produced by blending a reactive metal powder with a plurality of cubic boron nitride particles to form a blended mixture. The blended mixture is compressed to form a compressed mixture. The compressed mixture is subjected to a temperature and a pressure, where the temperature is controlled to cause etching of the plurality of cubic boron nitride particles by reaction of cubic boron nitride with the reactive metal powder, thereby forming a plurality of etched cubic boron nitride particles. Also, the temperature and pressure are controlled to cause boron nitride to remain in a cubic boron nitride phase. Afterwards, the plurality of etched cubic boron nitride particles is recovered from the compressed mixture to form the particle population. Preferably, the particle population contains no hexagonal boron nitride.

4 Claims, 8 Drawing Sheets

Related U.S. Application Data

(60) Provisional application No. 62/732,392, filed on Sep. 17, 2018.

(56) References Cited

U.S. PATENT DOCUMENTS

2010/0064594 A1* 3/2010 Pakalapati ........... C09K 3/1436
                                                      51/307
2014/0090309 A1* 4/2014 Dumm ................ C01B 21/0722
                                                      51/307

FOREIGN PATENT DOCUMENTS

| | | | |
|---|---|---|---|
| CN | 106905922 A | 6/2017 | |
| GB | 1598837 | 9/1981 | |
| KR | 20170111732 A * | 10/2017 | ......... C01B 21/0648 |
| KR | 10-1812738 | 12/2017 | |
| WO | 2014022214 | 2/2014 | |
| WO | 2014022214 A1 | 2/2014 | |
| WO | WO-2017111351 A1 * | 6/2017 | ............... B24D 3/04 |

* cited by examiner

2

CUBIC BORON NITRIDE PARTICLE POPULATION WITH HIGHLY-ETCHED PARTICLE SURFACE AND HIGH TOUGHNESS INDEX

This is a divisional of U.S. application Ser. No. 16/569,296 filed on Sep. 12, 2019, an application claiming the benefit of U.S. Application No. 62/732,392 filed on Sep. 17, 2018, the entire content of each of which is hereby incorporated by reference in its entirety.

BACKGROUND OF THE INVENTION

The present invention pertains to cubic boron nitride (CBN) particles and, more particularly, to a CBN particle population that simultaneously possesses highly-etched surfaces and a high toughness index (TI).

In many CBN applications, it is desirable to have a highly-etched (i.e., rough) particle surface. Such etched surfaces can provide better particle retention in a bond system and/or result in a particle that is self-sharpening during use. Although etched CBN particle populations exist, they typically have a low TI. This low TI causes them to perform poorly in certain applications. Accordingly, it would be desirable to provide an etched CBN particle population that does not suffer from a low TI.

SUMMARY OF THE INVENTION

The present invention achieves the above goal of providing a CBN particle population that simultaneously possesses highly-etched surfaces and a high TI. The surface is characterized by about one-micron- and sub-micron-size pits, with this surface feature being consistently present on almost all CBN particle facets. However, the TI of the CBN particle population is only about 10-20 points lower than a typical smoothed (i.e., non-etched, non-rough) CBN particle population with the same chemical composition, crystal structure and shape.

The CBN particle population of the present invention is produced by forming or obtaining a plurality of CBN particles. A reactive metal powder is blended with the plurality of CBN particles to form a blended mixture, and the blended mixture is compressed to form a compressed mixture. The compressed mixture is subjected to a temperature and a pressure, where the temperature is controlled to cause etching of the plurality of CBN particles by reaction of CBN with the reactive metal powder, thereby forming a plurality of etched CBN particles. Also, the temperature and pressure are controlled to cause boron nitride to remain in a cubic phase. Afterwards, the plurality of etched CBN particles is recovered from the compressed mixture to form the particle population. Preferably, the particle population contains no hexagonal boron nitride (HBN).

Additional objects, features and advantages of the invention will become more readily apparent from the following detailed description of preferred embodiments thereof when taken in conjunction with the drawings wherein like reference numerals refer to common parts in the several views.

DETAIL DESCRIPTION OF THE INVENTION

Figure 1:
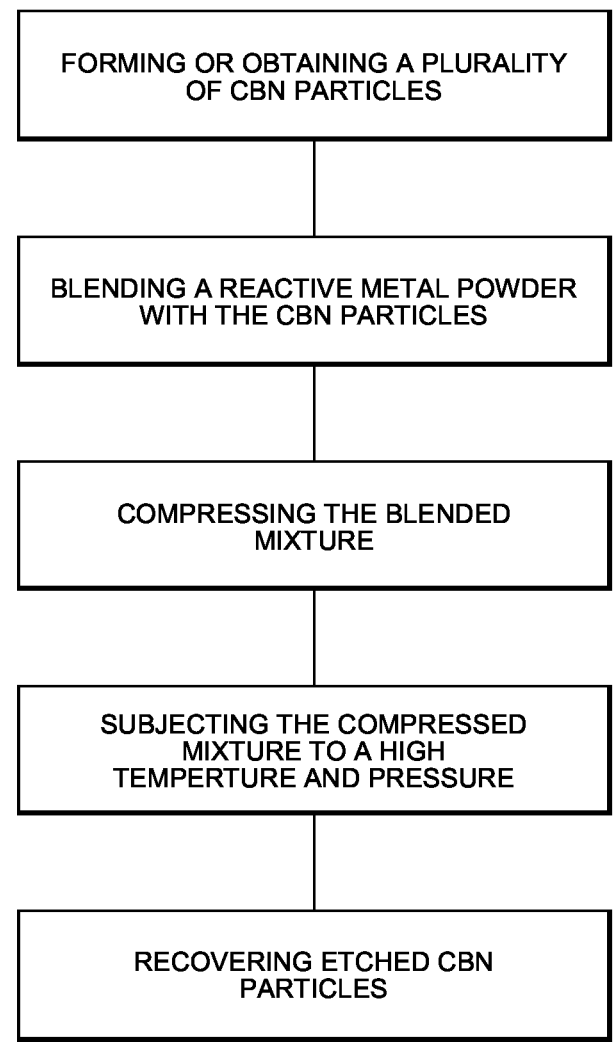
FIG. 1 is a flowchart showing a process for producing a CBN particle population in accordance with the present invention.

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting but merely as a representative basis for teaching one skilled in the art to employ the present invention.

In addition, as used herein, the term "about" means plus or minus 10% of the numerical value of the number with which it is being used. Therefore, about 50% means in the range of 45-55%. The term "particle" refers to a discrete body. A particle is also considered a crystal or a grain.

CBN particles, for use in the present invention, can be produced from HBN using catalyst systems, such as alkali and alkaline earth metal nitrides, under high pressure and temperature for a time period sufficient to form the cubic structure. The reaction mass is maintained under pressure and temperature conditions that thermodynamically favor the formation of CBN crystal. The CBN is then recovered from the reaction mass using a combination of water, acidic solutions or caustic chemicals using recovery methods. It should be noted that other methods of producing CBN are known, e.g., CBN can also be prepared via a temperature gradient method or a shock wave method.

Any combination of starting ingredients, which provides both the HBN and catalysts, can be employed. An embodiment of the starting reaction mixture can contain a source of boron, a source of nitrogen, and a source of catalyst metal. The source of the boron can be elemental boron, HBN, or material such as one of the boron hydrides that can decompose to elemental boron under conditions of the reaction. The source of nitrogen can be either HBN or a nitrogen-containing compound of a catalyst metal that can provide a source of nitrogen under reaction conditions. The catalyst metal can be employed as the elemental metal or as a catalyst compound that can decompose to the catalyst metal or to the catalyst metal nitride under reaction conditions.

The process is not limited to the catalytic conversion of HBN to CBN involving only one catalyst material. Thus, mixtures of two or more catalyst materials can be employed. Those mixtures can include one or more catalyst metals, one or more catalyst nitrides or one or more combinations of metals and nitrides. The mixtures can include reaction-inhibiting catalysts, such as silicon nitride or aluminum nitride, and reaction-promoting catalysts, such as alkali and alkaline earth metal nitride. In addition, alloys can also be employed in the practice of the invention. These alloys include alloys of more than one catalyst metal as well as alloys of a catalyst metal and a non-catalyst metal. Other raw material combinations are also possible.

The process can be carried out in any type of apparatus capable of producing the pressures and temperatures used to manufacture the superabrasive. An apparatus that can be used is described in U.S. Pat. Nos. 2,941,241 and 2,941,248, which are incorporated herein by reference. Examples of other apparatus include belt presses, cubic presses, and split-sphere presses. The apparatus includes a reaction volume in which controllable temperatures and pressures are provided and maintained for desired periods of time. The apparatus disclosed in the aforementioned patents is a high-pressure device for insertion between the platens of a hydraulic press. The high-pressure device contains an annular member, defining a substantially cylindrical reaction area, and two conical, piston-type members or punches designed to fit into the substantially cylindrical reaction area from either side of the annular member. A reaction vessel that fits into the annular member can be compressed by the two piston members to reach the pressures desired in manufacturing the CBN particles. The desired temperature is obtained by suitable means, such as by induction heating, direct or indirect resistive heating, or other methods.

In the present invention, after being formed by the process discussed above, CBN particles are etched to obtain rough surfaces. The process uses a nitride-forming metal, such as titanium, magnesium, zirconium, aluminum or lithium, as a reactant metal with the CBN. For example, at high temperatures, the CBN reacts with the zirconium and forms zirconium nitride and zirconium boride. This reaction creates pits and grooves on the surface of the CBN. After the reaction occurs, the zirconium nitride and zirconium boride can be removed, revealing a significantly roughened CBN surface where many intricate pockets or etch-pits are established. This texture provides many more sharp cutting edges on a particle than are present on a typical CBN particle. As a result, tool performance improves in applications utilizing the CBN particles of the present invention. These applications include precision grinding where the CBN particles are incorporated within a resin, metal, or vitrified bond system. The CBN particles of the present invention also improve the performance in honing and superfinishing, especially where the bonding materials include resins, metals, or glass fits. In addition, the CBN particles of the present invention improve the performance of tools in instances where the particles are electroplated or electroformed to the tool or when the particles are co-deposited within a coating.

The process of the present invention can be used with different forms of CBN, including monocrystalline and polycrystalline CBN, but is preferably used with monocrystalline CBN. The present invention applies to a wide range of CBN sizes from hundreds of microns in diameter to micron-sized powders. In one exemplary embodiment, CBN particles in sizes of less than about 100 microns are used. However, CBN particles in sizes over about 100 microns can be used as well. In an exemplary embodiment, the sizes of the CBN particles range from about 10 microns to about 1000 microns.

In general, as shown in FIG. 1, a method for producing a CBN particle population in accordance with the present invention comprises: forming or obtaining a plurality of CBN particles in a step 100; blending a reactive metal powder made of a material such as lithium, beryllium, calcium, strontium, magnesium, titanium, zirconium, aluminum, gallium, indium, tungsten, hafnium, chromium, cobalt, nickel, vanadium, tantalum, niobium, and iron with the CBN particles in a step 105; compressing the blended mixture in a step 110; subjecting the compressed mixture to a high pressure and temperature in a step 115; and recovering etched CBN particles in a step 120. The CBN particles are preferably monocrystalline CBN particles. The reactive metal powder can be zirconium, for example. The ratio of reactive metal powder to CBN particles can be 1:10 to 10:1, for example. The CBN particles can experience an average weight loss of more than about 5% due to this process. In step 115, the temperature can be about 1300° C. or greater, and the pressure can be about 3 gigapascals (GPa) or greater.

More specifically, to create the etched CBN particles of the present invention, from about 10 to about 80 weight percent CBN particles and from about 20 to about 90 weight percent zirconium particles are mixed using any appropriate mixing method that achieves a uniform mixture. For example, the weighed portions of the zirconium and CBN particles can be put into a jar, sealed, and inserted into a mixing device for at least about one hour or, alternatively, about 30 minutes to about one hour. A binder can optionally be added to the mixture prior to mixing. Binders provide lubricity to particle surfaces, allowing for denser packing and more intimate contact between the metal powder and CBN. Binders also help in holding a pressed body together as a green-body.

The mixture is then compressed so as to create an intimate mixture of CBN particles and zirconium particles. Any method can be used to compress the CBN particles and zirconium particles so long as they form an intimate mixture and the particles are in very close contact with one another. One method used to compress the mixture can be to place the mixture into a fixed die set on a press. In the die press, the mixture is subjected to pressure between about 5,000 and about 50,000 psi, between about 10,000 and about 40,000 psi, or between about 15,000 and about 30,000 psi to form a pellet. Isostatic pressing with deformable tooling can also be used to achieve the intimate contact. Alternatively, the mixture can be compressed by pressing it into a thin sheet that is several millimeters to several inches thick, e.g., by high pressure compaction rolls or briquetting rolls. The formed sheets can then be cut into smaller sections for further processing. Another method of compressing the mixture of zirconium and CBN particles includes mixing and extruding the mixture under pressure. Pelletizing the mixture of CBN and zirconium particles via a pelletizer or tumbling the mixture in a tumbling apparatus are also alternative methods that can be used to compress the mixture. Additional methods of compressing the mixture of zirconium and CBN particles include injection molding, pressing the mixture into a container, and tape casting. The pellets, bricks, briquettes, or cakes formed by these methods can then be further processed as discussed below. Alternatively, individual CBN particles can be coated with metal particles by ion implantation, sputtering, spray drying, electrolytic coating, electroless coating or any other applicable method so long as the zirconium and CBN particles are in intimate contact with one another.

After compressing the mixture of CBN and zirconium particles, the compressed mixture, which can be in a pellet, an aggregate or other condensed form, is placed into a furnace and, in a hydrogen atmosphere, vacuum atmosphere, or an inert gas atmosphere, heated to a temperature in the range of about 900° C. to about 2300° C. For example, temperatures of about 1000° C. to about 1400° C., about 1100° C. to about 1400° C., or about 1300° C. can be used. The compressed mixture can be heated for a time period in the range of about five minutes up to about five hours. For example, time periods ranging from about thirty minutes up to about two hours or from about one hour up to about two hours can be used.

Unlike prior etching processes, the compressed mixture is also subjected to a high pressure during this heating. For example, the compressed mixture can be subjected to a pressure in the range of about 3 to about 6 GPa. The reason for this relates to the thermodynamics of boron nitride. CBN is not thermodynamically stable under normal atmospheric temperature and pressure conditions. Instead, it is kinetically trapped in the CBN phase. When heated during prior etching processes, at least some of the CBN is able to change phase to HBN (which is boron nitride's thermodynamically preferred phase under such conditions), thereby significantly reducing the TI of the CBN particle population. Specifically, the resulting TI reduction in such processes is typically about 30. In the present invention, the use of a high pressure during etching prevents the CBN from changing phase to HBN since CBN is boron nitride's thermodynamically preferred phase under the temperature and pressure conditions chosen. This decreases the TI reduction caused by the etching process but does not completely eliminate it since the etching itself reduces the TI of the CBN particle population. Specifically, the TI reduction in the etching process of the present invention is only about 10-20. As a result, the present invention is able to provide an etched CBN particle population with a high TI.

Although certain exemplary temperatures and pressures have been provided, any temperature and pressure combination that satisfies the following two goals can be used. First, the temperature should be high enough to cause the desired etching of the CBN particles by reaction of the CBN with the nitride-forming metal. Second, the temperature and pressure should be chosen to ensure that the boron nitride remains in the CBN phase and does not reenter the HBN phase (or enter a third phase). In other words, the temperature and pressure should be chosen to cause the boron nitride to remain in the CBN phase. Preferably, this second goal is satisfied throughout the entire etching process to prevent any of the CBN from converting to HBN.

After etching is complete and the compressed mixture of CBN and reactive metal particles has cooled, the etched CBN particles are recovered by dissolving the compressed mixture in common acids. Acids that can be used include hydrochloric acid, hydrofluoric acid, nitric acid and certain combinations thereof. The acid (or acids) are added in an acid-to-compressed-mixture ratio of 100:1 to 1000:1 (by volume). The mixture is then heated to between about 100° C. and about 120° C. for a time period of from about six to about eight hours, for example. Next, the solution is cooled, the liberated CBN particles settles, and the solution is decanted. These recovery steps are repeated until substantially all the reactive metal, metal nitrides and metal borides have been digested.

Depending on the furnace conditions chosen, more or less reaction can occur between the metal and the CBN. The more the metal powder etches into the CBN, the more nitrides and borides are formed and, thus, more weight is lost by the CBN. To completely dissolve the nitrides and borides, higher quantities of acid or additional dissolution treatments can be used. The CBN particles are then washed, such as in water, to remove the acids and residue. Subsequently, the CBN particles are dried in an oven, air dried, subjected to microwave drying, or other drying methods known in the art.

The CBN particles of the present invention are useful in many applications including lapping, grinding, cutting, polishing, dicing, sintered abrasives or abrasive compacts, wire for wire saws, and honing. In general, the roughened surfaces of the CBN particles aid in the retention of the particles within a tool or resin bond system. The roughened surfaces can also provide higher material removal rate with better free-cutting ability. In certain exemplary embodiments, the CBN particles are incorporated into tools such as grinding wheels, fixed abrasive wires, honing tools, dicing blades, polishing films, chemical mechanical polishing (CMP) pad conditioners, polishing compounds, and composite CBN wear coatings, for example.

Figure 2:
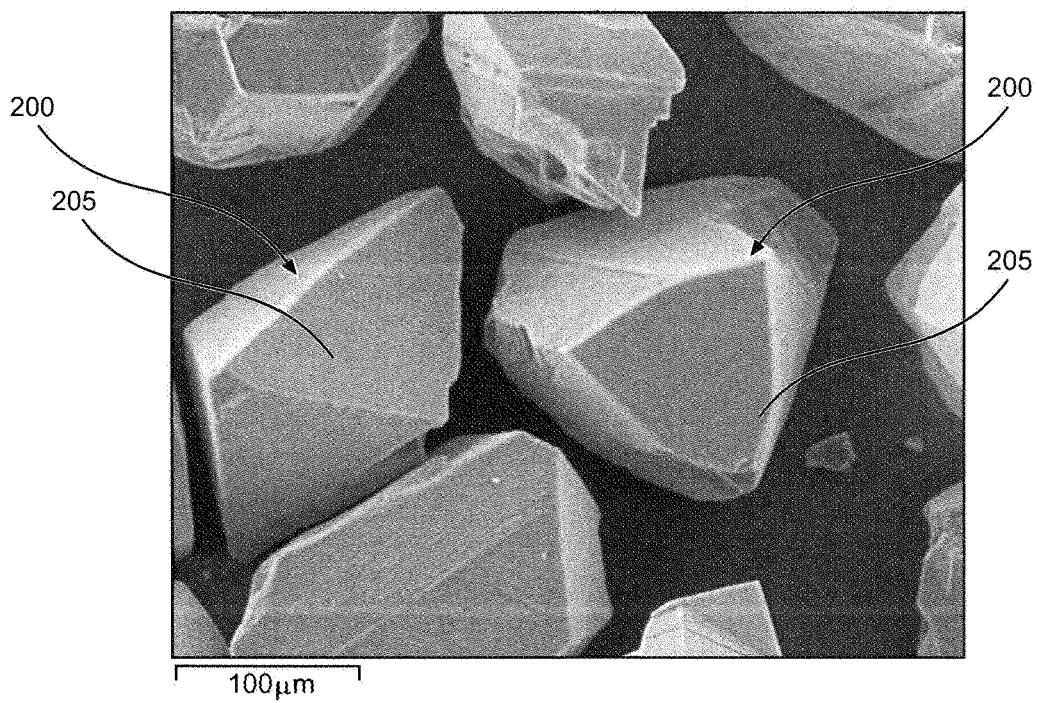
FIG. 2 is an image from a scanning electron microscope (SEM) showing a plurality of CBN particles before etching.
Figure 3:
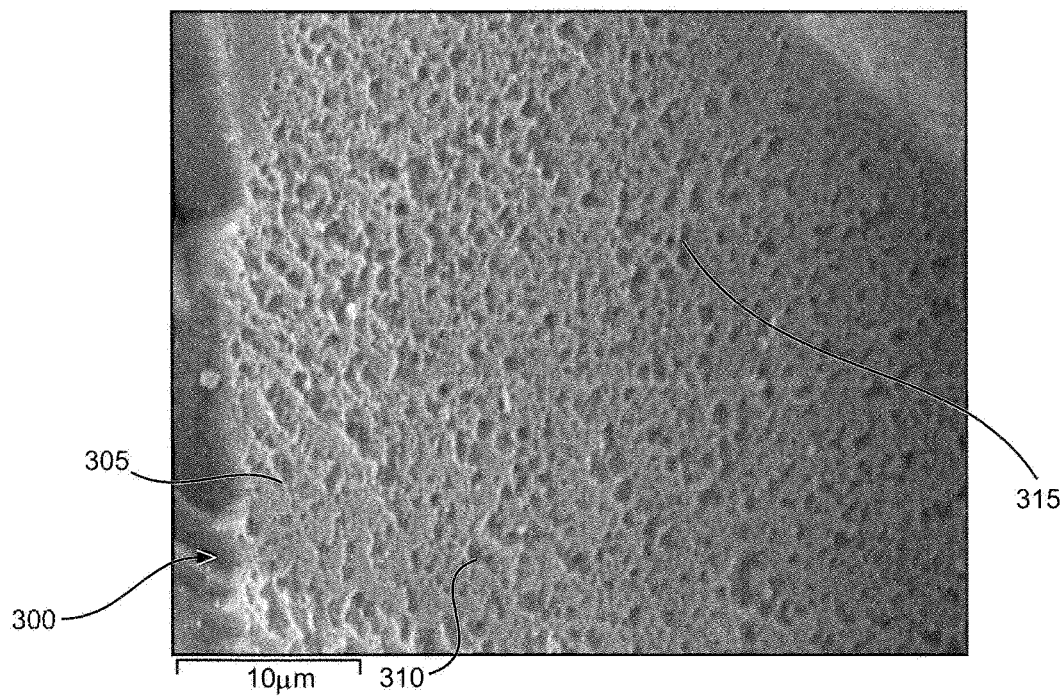
FIG. 3 is an image from an SEM showing one of the CBN particles of FIG. 2 after it has undergone the etching process of the present invention.

FIGS. 2 and 3 are SEM images of CBN particles. FIG. 2 shows several CBN particles before etching, while FIG. 3 shows one of these CBN particles after it has undergone the etching process of the present invention. In particular, a plurality of CBN particles 200 can be seen in FIG. 2, with each of CBN particles 200 including a plurality of facets 205. The surfaces of facets 205 are smooth. However, after etching, such surfaces exhibit pits and grooves. For example, in FIG. 3, an etched CBN particle 300 includes a facet 305 having a plurality of pits 310 and a plurality of grooves 315. In the present invention, these surface features are micron- and sub-micron-sized. That is, pits 310 are typically between about 500 nm and about 1.5 microns in width, while grooves 315 are typically about 500 nm in width and between about 5 microns and about 30 microns in length. The depth of both pits and grooves is between about 100 nm and 1 micron.

Figure 4:
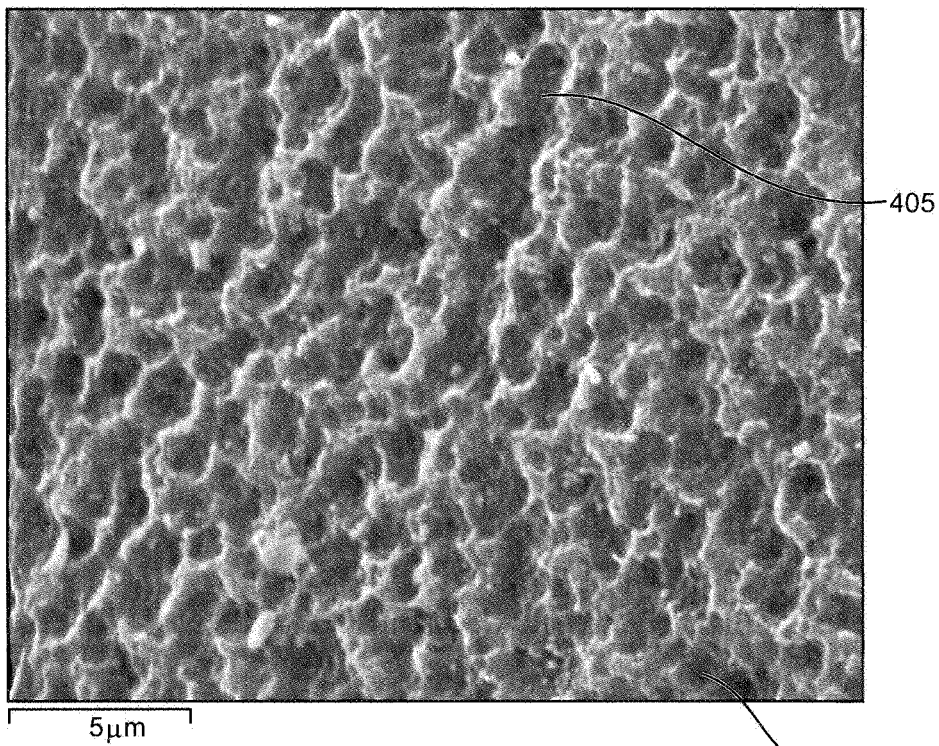
FIG. 4 is another image from an SEM showing a CBN particle after it has undergone the etching process of the present invention.
Figure 5:
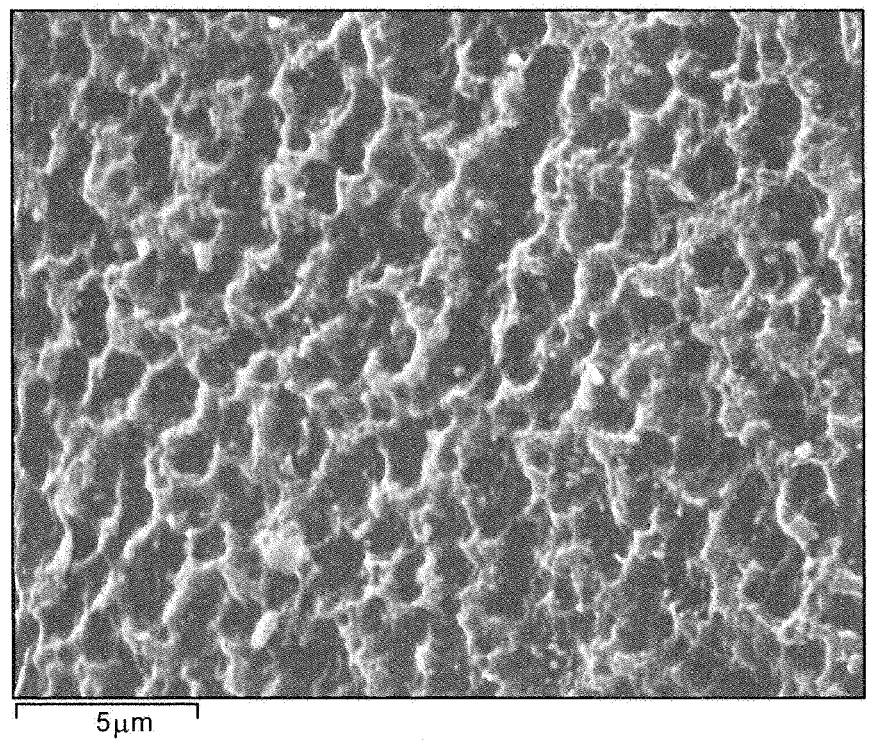
FIG. 5 is a conservative threshold analysis of the percentage area covered by pits and grooves for the image of FIG. 4.
Figure 6:
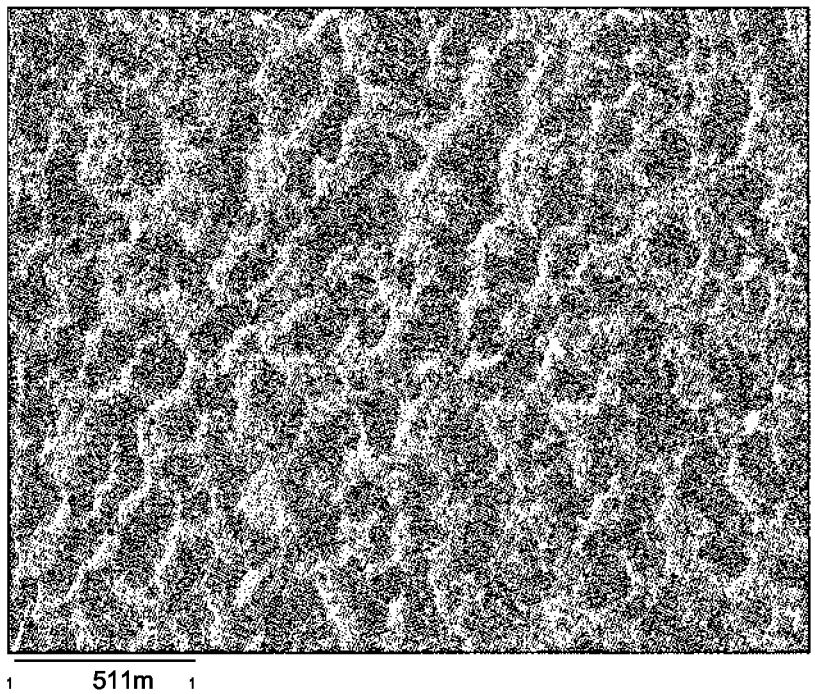
FIG. 6 is a moderate threshold analysis of the percentage area covered by pits and grooves for the image of FIG. 4.
Figure 7:
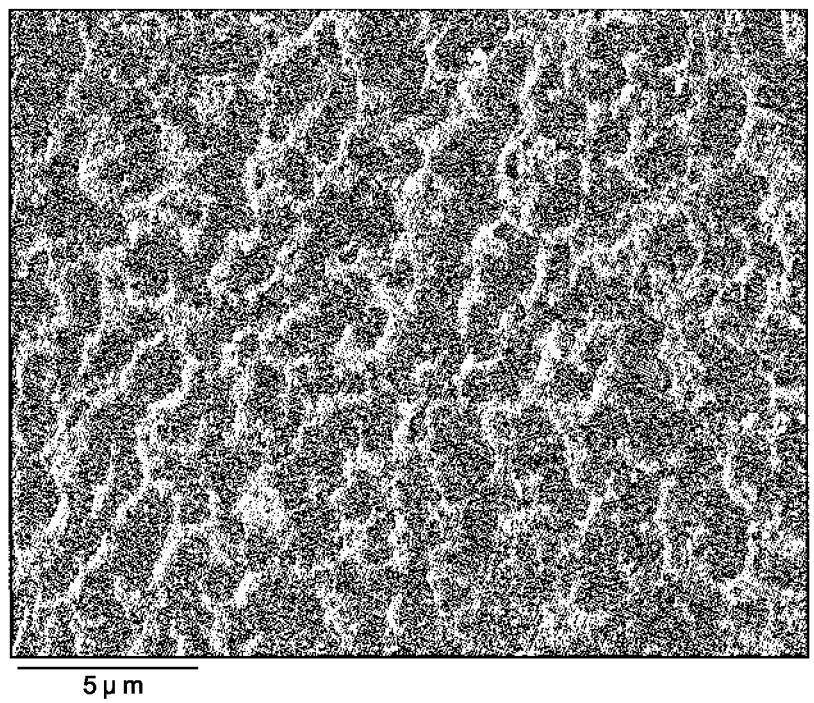
FIG. 7 is an aggressive threshold analysis of the percentage area covered by pits and grooves for the image of FIG. 4.
Figure 8:
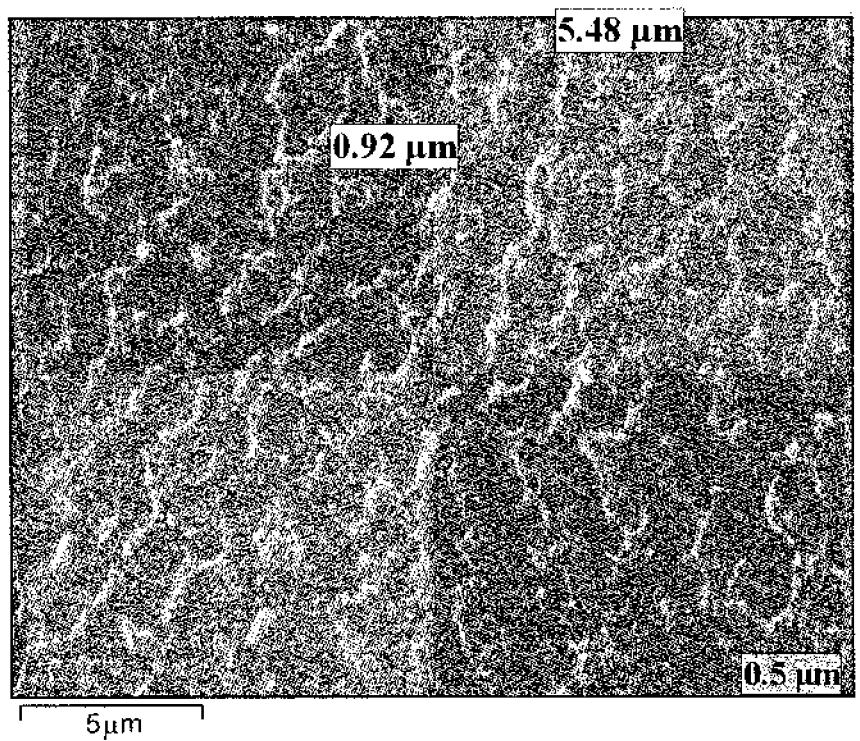
FIG. 8 is a size analysis of the pits and grooves in the image of FIG. 4.

Similar to FIG. 3, FIG. 4 is a high magnification (5,000×) SEM image of the surface of an etched CBN particle of the present invention. In the image, dark areas are deeper into the particle than light areas. Again, the surface is characterized by pits 400 and grooves 405. Isolated pits 400 and grooves 405 are visible. An analysis of the etched CBN particle of FIG. 4 provided estimates as to what percent of the particle is covered by pits 400 or grooves 405. The conservative estimate was that 20% of the particle surface is covered by pits 400 or grooves 405, while the moderate estimate was 41%, and the aggressive estimate was 60%. This is represented visually in FIGS. 5-7, which correspond to the conservative, moderate, and aggressive estimates, respectively. The analysis also provided size information for pits 400 and grooves 405. Pits 400 and grooves 405 are both less than about one micron wide, and grooves 405 are up to about six microns long, as shown in FIG. 8. A preliminary cross-sectional scanning electron microscope analysis indicated that pits 400 and grooves 405 are both less than about one micron deep. In general a plurality of etched cubic boron nitride particles is produced with each of the cubic boron nitride particles includes a plurality of pits and a plurality of grooves and the toughness index of the particle population is about 10 to about 20 points lower than a non-etched, non-rough cubic boron nitride particle population with the same chemical composition, crystal structure and shape.

Experiments

In developing the present invention, several different CBN particle populations were produced. These different particle populations help illustrate the benefits provided by the present invention.

Figure 9:
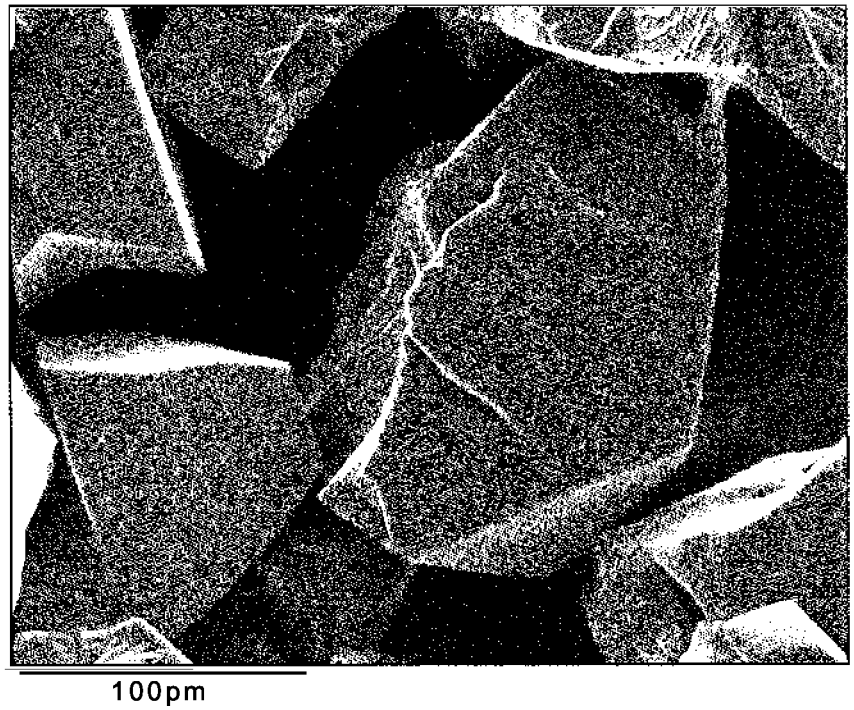
FIG. 9 is an image from an SEM showing a plurality of CBN particles before a first experimental etching process.
Figure 10:
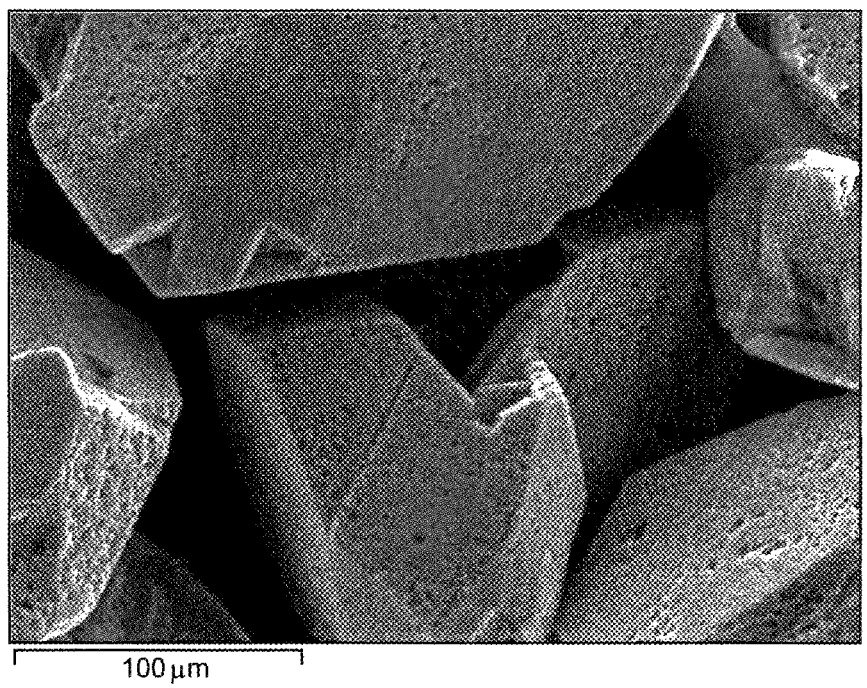
FIG. 10 is an image from an SEM showing a plurality of CBN particles after the first experimental etching process.

In a first experiment, a CBN particle population was produced with an aggressively etched surface and a low TI. Although this particle population exhibited excellent wetting behavior and good crystal retention during grinding due to the etched surface, the TI was deemed to be too low. FIGS. 9 and 10 show the CBN particle population of the first experiment before and after etching, respectively.

Figure 11:
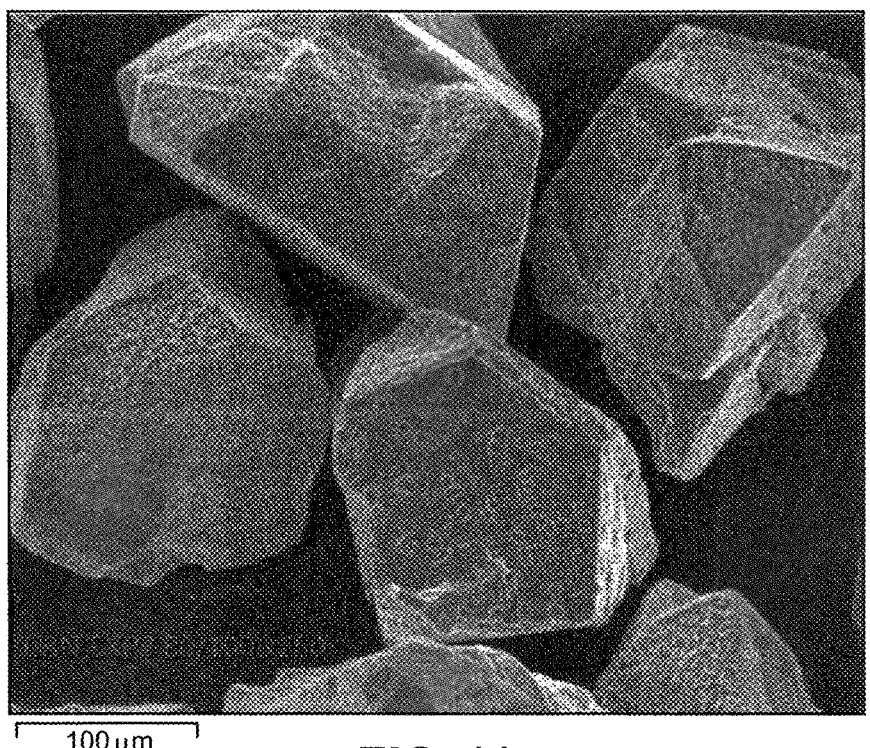
FIG. 11 is an image from an SEM showing a plurality of CBN particles after a second experimental etching process.

In a second experiment, a CBN particle population was produced with an aggressively etched surface and a medium TI. Again, this particle population exhibited excellent wetting behavior and good crystal retention during grinding due to the etched surface. However, the TI was still deemed to be too low. FIG. 11 shows the CBN particle population of the second experiment after etching.

Figure 12:
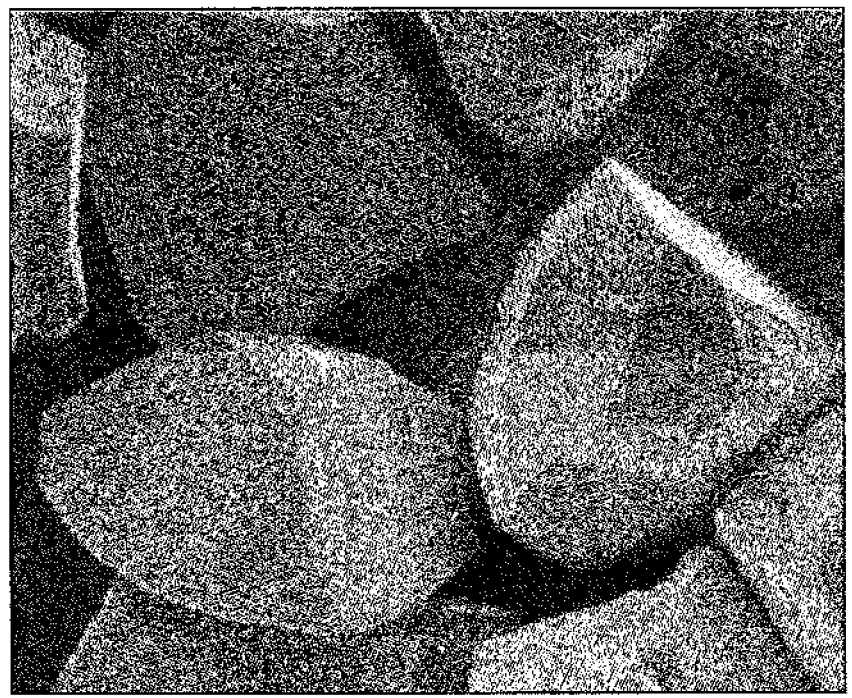
FIG. 12 is an image from an SEM showing a plurality of CBN particles before a third experimental etching process.
Figure 13:
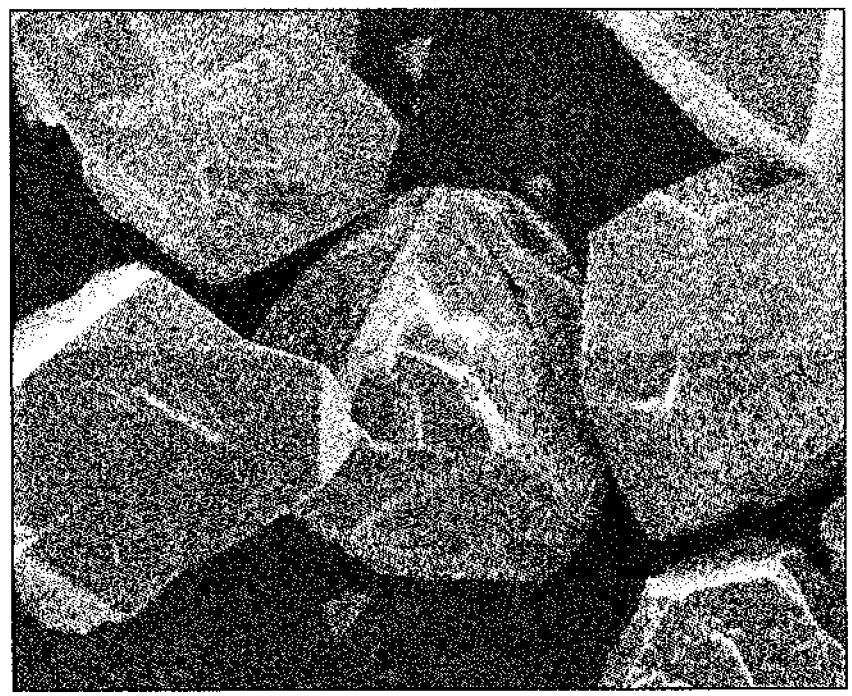
FIG. 13 is an image from an SEM showing a plurality of CBN particles after the third experimental etching process.

In a third experiment, a CBN particle population was produced with a mildly etched surface and a relatively high TI. This particle population exhibited decent wetting behavior, crystal retention during grinding, and TI. FIGS. 12 and 13 show the CBN particle population of the third experiment before and after etching, respectively.

In each of the first three experiments, etching was carried out at atmospheric pressure. In a fourth experiment, etching was carried out at high pressure in accordance with the present invention. The CBN particle population produced had an aggressively etched surface with a uniform submicron surface pattern and a high TI.

Figure 14:
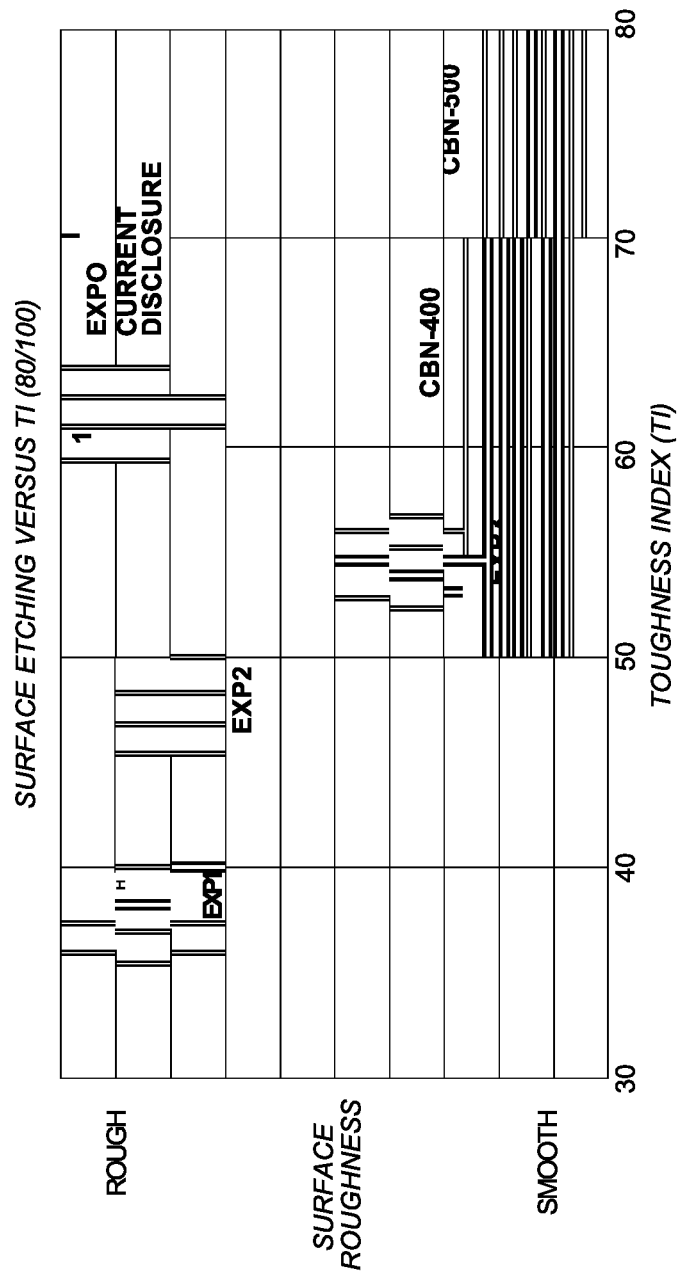
FIG. 14 is a graph of surface roughness vs TI for several different CBN particle populations.

The results of these experiments are plotted in FIG. 14, with experiments 1-4 labeled EXP1-4, respectively. In addition, two unetched CBN particle populations, labeled CBN-400 and CBN-500, are plotted. As can be seen in FIG. 14, surface roughness and TI are typically inversely related. The one outlier is the CBN particle population of the present invention, which exhibits both a rough surface and a high TI.

Based on the above, it should be readily apparent that the present invention provides a CBN particle population that simultaneously possesses a high TI and highly-etched surfaces. While certain preferred embodiments of the present invention have been set forth, it should be understood that various changes or modifications could be made without departing from the spirit of the present invention. For example, an oxide or a metal such as nickel or titanium can cover the particles or the particles can be coated with a layer of glass wherein the glass weight percent is preferably less than 10% of the weight of the particle. In general, the invention is only intended to be limited by the scope of the following claims.

The invention claimed is:

1. A method for producing an etched monocrystalline cubic boron nitride particle population, comprising:
    blending an amount of from 20 wt. % to 90 wt. % of a reactive zirconium powder with an amount of from 10 wt. % to 80 wt. % of a plurality of monocrystalline cubic boron nitride particles based on a total amount of a blended mixture;
    compressing the blended mixture to form a compressed blended mixture;
    subjecting the compressed blended mixture to a temperature and a pressure of 3 gigapascals to cause etching of the plurality of monocrystalline cubic boron nitride particles by reaction of the plurality of monocrystalline cubic boron nitride particles with the reactive zirconium powder, such that boron nitride remains in a cubic phase and does not convert to hexagonal boron nitride and a plurality of etched monocrystalline cubic boron nitride particles are formed; and
    recovering the plurality of etched monocrystalline cubic boron nitride particles free of the boron nitride being in a hexagonal phase from the compressed blended mixture to form the etched monocrystalline cubic boron nitride particle population,
    wherein a toughness index of the plurality of etched monocrystalline cubic boron nitride particles is 10 to 20 points lower than non-etched, non-rough cubic boron nitride particles with the same chemical composition, crystal structure, and shape.

2. The method of claim 1, wherein the temperature is 1300° C. or greater.

3. The method of claim 1, wherein a particle size of the plurality of etched monocrystalline cubic boron nitride particles is from 10 microns to 1000 microns.

4. The method of claim 1, wherein each of the plurality of etched monocrystalline cubic boron nitride particles includes a plurality of pits and a plurality of grooves, and each of the plurality of pits has a width of from 500 nanometers to 1.5 microns and a depth of from 100 nanometers to 1 micron, and each of the plurality of grooves has a width of 500 nanometers, a length of from 5 microns to 30 microns, and a depth of from 100 nanometers to 1 micron.

* * * * *